US011708867B2

(12) United States Patent
Sullivan et al.

(10) Patent No.: US 11,708,867 B2
(45) Date of Patent: Jul. 25, 2023

(54) POWER TRANSFER COMPONENT WITH CLUTCH HAVING COMPONENTS WITH GEOMETRY FOR INCREASED STRENGTH AND/OR REDUCED MASS

(71) Applicant: BorgWarner Inc., Auburn Hills, MI (US)

(72) Inventors: Christopher Sullivan, Auburn Hills, MI (US); Ujval K. Taunk, Auburn Hills, MI (US); Thad S. Morton, Seneca, SC (US); Gregory Beyerlein, Auburn Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/584,485

(22) Filed: Jan. 26, 2022

(65) Prior Publication Data

US 2022/0235827 A1 Jul. 28, 2022

Related U.S. Application Data

(60) Provisional application No. 63/141,680, filed on Jan. 26, 2021.

(51) Int. Cl.
*F16D 13/64* (2006.01)
*F16D 13/52* (2006.01)

(52) U.S. Cl.
CPC ........... *F16D 13/648* (2013.01); *F16D 13/52* (2013.01); *F16D 13/644* (2013.01); *F16D 2300/10* (2013.01)

(58) Field of Classification Search
CPC ........ F16D 13/52–2013/565; F16D 13/64–69; F16D 2300/10
See application file for complete search history.

(56) References Cited

U.S. PATENT DOCUMENTS

| 6,158,561 A * | 12/2000 | Sakai .................... F16D 13/648 |
| | | 192/107 M |
| 2003/0106758 A1* | 6/2003 | Hirota ................... F16D 27/115 |
| | | 192/84.91 |
| 2007/0062777 A1 | 3/2007 | Zagrodzki et al. |

(Continued)

FOREIGN PATENT DOCUMENTS

| AT | 15554 U1 | 12/2017 |
| DE | 102016201508 A1 | 8/2017 |

(Continued)

*Primary Examiner* — David R Morris
(74) *Attorney, Agent, or Firm* — Reising Ethington P.C.

(57) ABSTRACT

A friction clutch with a clutch plate having a hub member, a rim portion and a plurality of rib members. The hub member has a plurality of female hub teeth. The rim portion is disposed concentrically about the hub member and has a rim member and a friction material that is coupled to the rim member. Each of the rib members extend radially between the hub member and the rim member to couple the hub member and the rim member to one another. Each one of the rib members is intersected by at least three of the other rib members. Each of the other rib members intersecting the one of the rib members at a distinct location such that the distinct locations are spaced apart from one another along the one of the rib members.

20 Claims, 8 Drawing Sheets

(56) References Cited

U.S. PATENT DOCUMENTS

| | | | |
|---|---|---|---|
| 2007/0108009 A1* | 5/2007 | Ando | F16D 13/64 |
| | | | 192/84.91 |
| 2007/0193850 A1* | 8/2007 | Sturgin | F16D 13/648 |
| | | | 192/212 |
| 2017/0122423 A1* | 5/2017 | Bongard | F16H 48/40 |
| 2019/0195293 A1 | 6/2019 | Foege et al. | |
| 2019/0345989 A1 | 11/2019 | Dannwolf et al. | |
| 2019/0376565 A1 | 12/2019 | Oyabu et al. | |

FOREIGN PATENT DOCUMENTS

| | | |
|---|---|---|
| DE | 202018002101 U1 | 6/2018 |
| DE | 202019102932 U1 | 7/2019 |

\* cited by examiner

POWER TRANSFER COMPONENT WITH CLUTCH HAVING COMPONENTS WITH GEOMETRY FOR INCREASED STRENGTH AND/OR REDUCED MASS

CROSS-REFERENCE TO RELATED APPLICATIONS

This application claims the benefit of U.S. Provisional Application No. 63/141,680 filed Jan. 26, 2021, the disclosure of which is incorporated by reference as if fully set forth herein.

FIELD

The present disclosure relates to a power transfer component with a clutch having components with a geometry that provides the component with increased strength and/or reduced mass.

BACKGROUND

This section provides background information related to the present disclosure which is not necessarily prior art.

Friction clutches are employed in many power transfer components, such as components of a vehicle driveline, to selectively transmit rotary power. A friction clutch typically includes two sets of clutch plates that are interleaved with one another. An axially-directed force is applied to the clutch plates to frictionally engage them with one another so as to permit torque transmission. The magnitude of the torque that can be transmitted through a friction clutch is related to the total area over which the clutch plates contact one another. In situations where it is possible for a relatively large amount of torque to be transmitted through a friction clutch, the size of the friction clutch can become quite large, either in overall diameter (to increase the diameter of the clutch plates to thereby increase the surface area over which the clutch plates contact one another), overall length (to increase the quantity of the clutch plates to thereby increase the surface area over which the clutch plates contact one another), or both. The increased size of the friction clutch can significantly increase the mass of the clutch.

SUMMARY

This section provides a general summary of the disclosure, and is not a comprehensive disclosure of its full scope or all of its features.

In one form, the present disclosure provides a friction clutch with a clutch plate having a hub member, a rim portion and a plurality of rib members. The hub member has a plurality of female hub teeth. The rim portion is disposed concentrically about the hub member and has a rim member and a friction material that is coupled to the rim member. Each of the rib members extend radially between the hub member and the rim member to couple the hub member and the rim member to one another. Each one of the rib members is intersected by at least three of the other rib members. Each of the other rib members intersecting the one of the rib members at a distinct location such that the distinct locations are spaced apart from one another along the one of the rib members.

In another form, the present disclosure provides a friction clutch with a clutch plate having a hub member, a rim portion and a plurality of rib members. The hub member has a plurality of female hub teeth. The rim portion is disposed concentrically about the hub member and has a rim member and a friction material that is coupled to the rim member. Each of the rib members extends radially between the hub member and the rim member to couple the hub member and the rim member to one another. The rib members intersect one another between the female hub teeth and the rim member to form a plurality of mass reduction apertures. A region of the clutch plate that is disposed radially between the hub member and the rim member has a first area. The rib members collectively have a second area. The mass reduction apertures collectively have a third area. A sum of the second and third areas is equal to the first area. The third area is greater than the second area.

In still another form, the present disclosure provides a friction clutch that includes a hub, which is rotatable about a rotary axis, a clutch housing, and a clutch pack. The clutch housing has a radially-extending segment, a circumferentially-extending segment, and an intermediate segment. The radially-extending segment has an annular shape and is oriented perpendicular to the rotary axis. The circumferentially-extending segment is disposed about the rotary axis concentric with the hub. The circumferentially-extending segment defines a plurality of internal teeth. The intermediate segment connects the radially-extending segment to the circumferentially-extending segment. The clutch housing has a first axial end, which is formed in part by an exterior surface of the radially-extending wall, and a second axial end that is opposite the first axial end and which is formed by the circumferentially-extending segment. The clutch pack is received in the clutch housing and has a plurality of first clutch plates, which are axially-slidably but non-rotatably coupled to the hub, and a plurality of second clutch plates that are interleaved with the first clutch plates. The second clutch plates have a plurality of external teeth that are engaged to the internal teeth on the circumferentially-extending segment to thereby axially-slidably but non-rotatably couple the second clutch plates to the clutch housing. The intermediate segment includes a radially-extending portion, a first frusto-conical portion, a second frusto-conical portion, and a transition portion. The radially-extending portion is concentric about, parallel to, and spaced axially apart from the radially-extending wall. The first frusto-conical portion is coupled to a radially inner side of the radially-extending portion and converges toward the rotary axis with increasing distance along the rotary axis from the radially-extending portion. The first frusto-conical portion has a cone angle with a first magnitude. The second frusto-conical portion is coupled to a radially inner side of the first frusto-conical portion and converges toward the rotary axis with increasing distance along the rotary axis from the first frusto-conical portion. The second frusto-conical portion has a cone angle with a second magnitude that is smaller than the first magnitude. The transition portion connects a radially outer side of the radially-extending segment to a radially inner side of the second frusto-conical portion. The transition portion has a profile that is defined by a radius that directly connects the radially outer side of the radially-extending segment to the radially inner side of the second frusto-conical portion. The radius is centered at a location that is disposed between the first axial end of the clutch housing and the radially inner side of the first frusto-conical portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
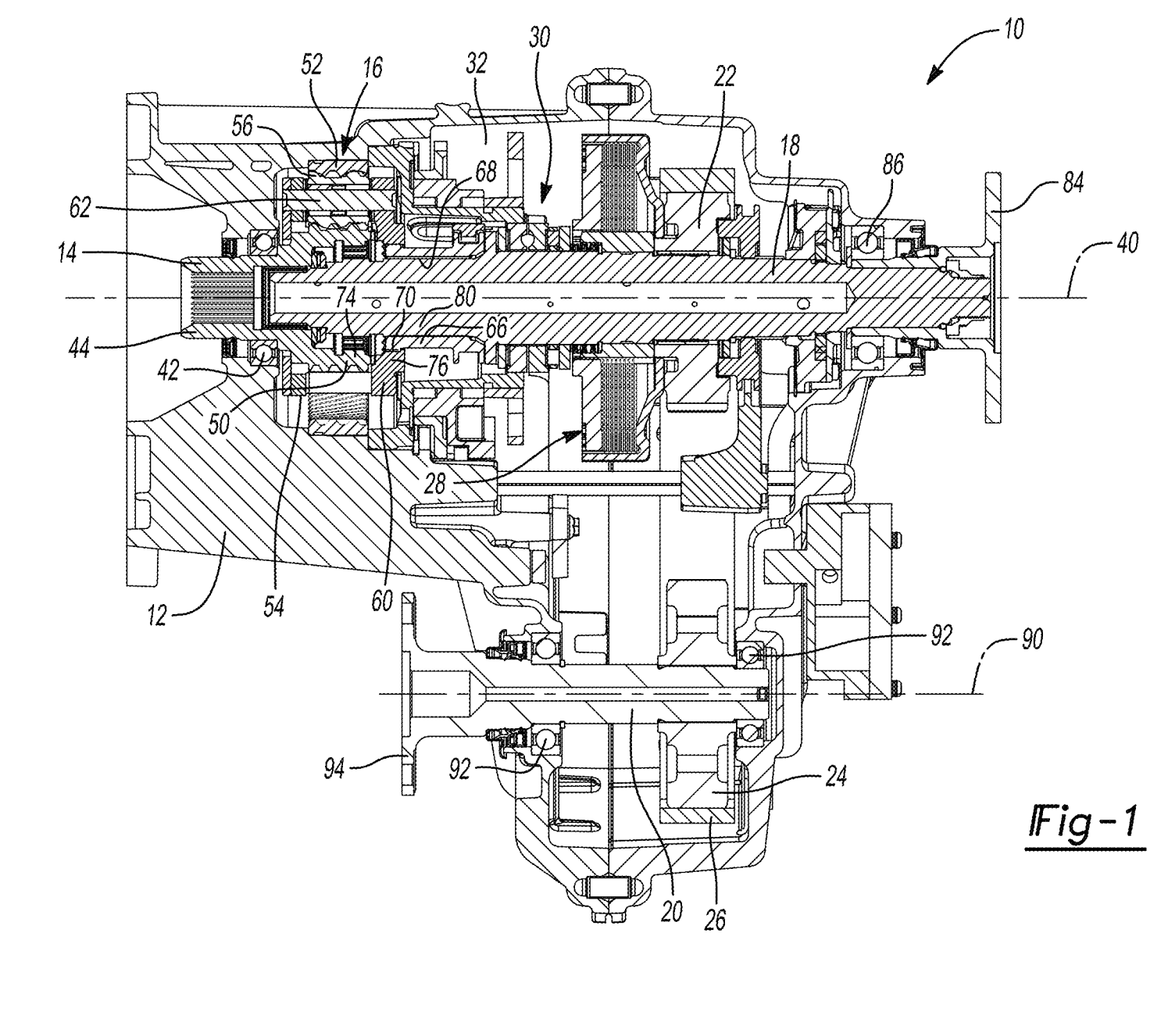
FIG. 1 is a longitudinal section view of an exemplary driveline component having a clutch constructed in accordance with the teachings of the present disclosure.

With reference to FIG. 1, an exemplary driveline component constructed in accordance with the teachings of the present disclosure is generally indicated by reference numeral 10. The driveline component 10 is illustrated to be a transfer case of the type that is selectively operable in a 2-wheel drive mode and a 4-wheel drive mode. It will be appreciated, however, that the teachings of the present disclosure have application to various other types of driveline components, including power take-off units, axle assemblies and electro-hydraulic clutches (e.g., a Haldex® coupling manufactured by BorgWarner Inc. of Auburn Hills, Mich.).

The driveline component 10 can include a housing 12, an input shaft 14, a two-speed transmission 16, a first output shaft 18, a second output shaft 20, a drive element 22, a driven element 24, an endless power transmitting component 26, a friction clutch 28, and a clutch actuator 30. The housing 12 can comprise a pair of housing halves (not specifically shown) that can be fastened together to define an internal cavity 32 into which the input shaft 14, the first and second output shafts 18 and 20, the friction clutch 28, the drive and driven elements 22 and 24, the endless power transmitting component 26, and the clutch actuator 30 can be received.

The input shaft 14 can be supported for rotation about a first axis 40 relative to the housing 12 by a first bearing 42. In the example provided, the input shaft 14 has female splined input end 44 that is configured to receive and matingly engage a male splined end (not shown) of power and drive train (not shown) that provides a source of rotary power.

The two-speed transmission 16 is a single-stage planetary transmission in the example provided and includes a sun gear 50, a ring gear 52, a planet carrier 54 and a plurality of planet gears 56. The sun gear 50 is coupled for rotation with the input shaft 14. In the example provided, the sun gear 50 and the input shaft 14 are integrally and unitarily formed such that the sun gear 50 is fixedly coupled to the input shaft 14. The ring gear 52 is non-rotatably coupled to the housing 12. The planet carrier 54 is rotatably about the first axis 40 and includes a carrier body 60 and a plurality of carrier pins 62. The carrier pins 62 are fixedly coupled to the carrier body 60 and are spaced apart about the first axis 40. Each of the planet gears 56 is rotatably received on an associated one of the carrier pins 62 and is meshingly engaged with the sun gear 50 and the ring gear 52. A range sleeve 66 is disposed concentrically about the first axis 40 and has set of internal teeth 68 and a set of external teeth 70. The range sleeve 66 can be moved between a high-range position, in which the set of external teeth 70 are engaged to a set of internal teeth 74 formed on the sun gear 50, a low-range position, in which the set of external teeth 70 are engaged to a set of internal teeth 76 formed on the carrier body 60, and a neutral position that is intermediate the high-range position and the low-range position in which the set of external teeth 70 are disengaged from the sets of internal teeth 74 and 76 formed on the sun gear 50 and the carrier body 60, respectively.

The first output shaft 18 includes a first end, which is received into the input shaft 14, a second end opposite the first end, and a splined segment 80 that is disposed between the first and second ends. A bearing (not specifically shown) can be disposed radially between the first end of the first output shaft 18 and the input shaft 14 and can support the first output shaft 18 for rotation about the first axis 40 relative to the input shaft 14. The second end of the first output shaft 18 can be fixedly coupled to a first output flange 84. The first output flange 84 is configured to be coupled to a propshaft (not shown) in a conventional manner to permit rotary power to be transmitted from the first output shaft 18 to another driveline component, such as a rear axle assembly (not shown). A bearing 86 can support the second end of the first output shaft 18 and the first output flange 84 for rotation about the first axis 40 relative to the housing 12. The splined segment 80 can be engaged to the set of internal teeth 68 formed on the range sleeve 66 to thereby non-rotatably but axially slidably couple the range sleeve 66 to the first output shaft 18.

The second output shaft 20 can be supported for rotation about a second axis 90 relative to the housing 12 by a pair of bearings 92. The second axis 90 can be parallel to the first axis 40. The second output shaft 20 can have a second output flange 94 that can be configured to engage a mating flange (not shown) on a propshaft (not shown) that transmits rotary power from the second output shaft 20 to another driveline component, such as a front axle assembly (not shown).

The drive element 22 is disposed concentrically about the first output shaft 18 and the driven element 24 can be coupled to the second output shaft 20 for common or joint rotation. The endless power transmitting component 26 is configured to transmit rotary power between the drive element 22 and the driven element 24. In the example provided, the drive and driven elements 22 and 24 are sprockets and the endless power transmitting component is a loop of chain. It will be appreciated, however, that the drive and driven elements 22 and 24 could be pulleys and the endless power transmitting component 26 could be a belt.

Figure 2:
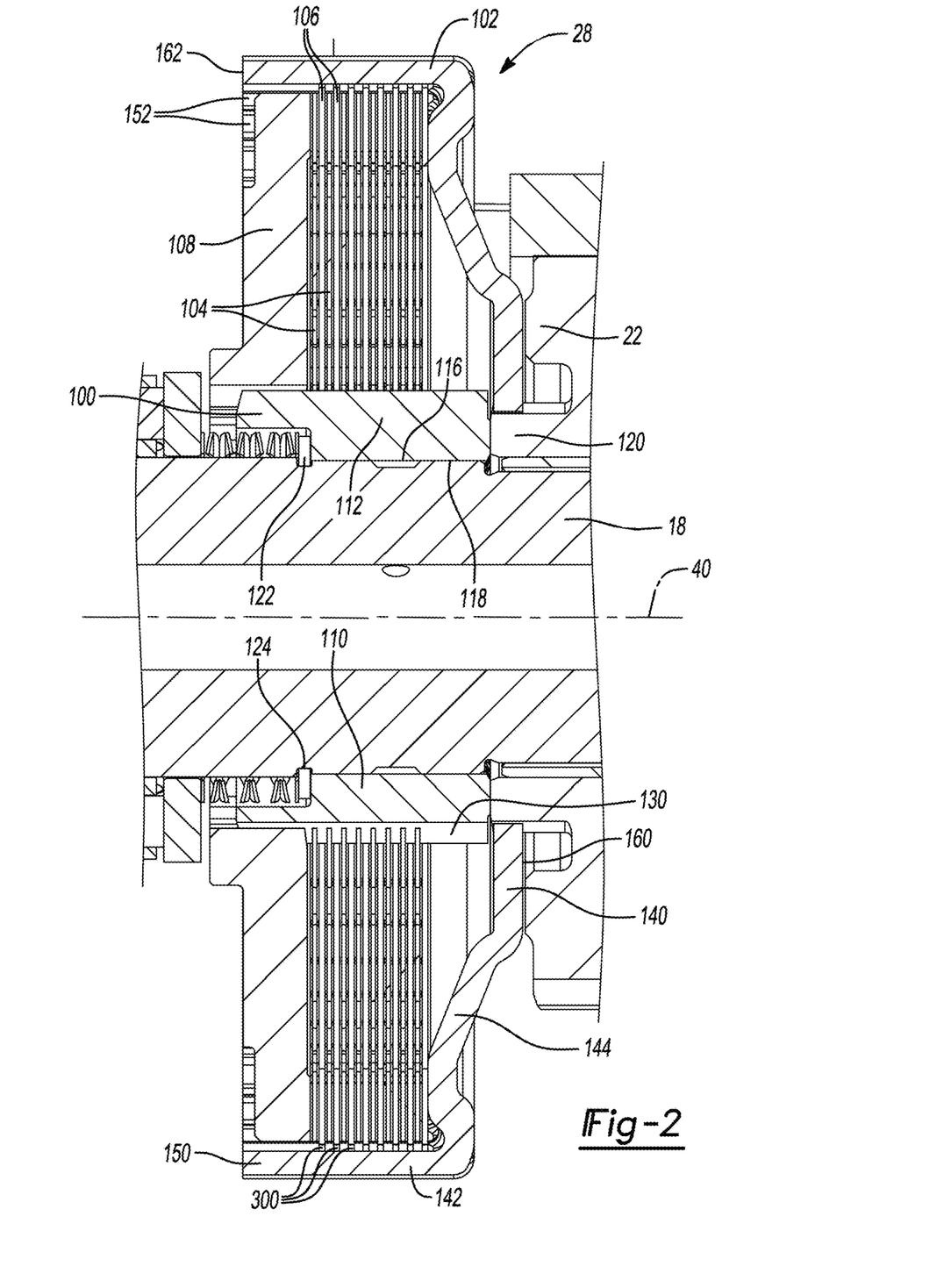
FIG. 2 is an enlarged portion of FIG. 1 illustrating a friction clutch in more detail.
Figure 3:
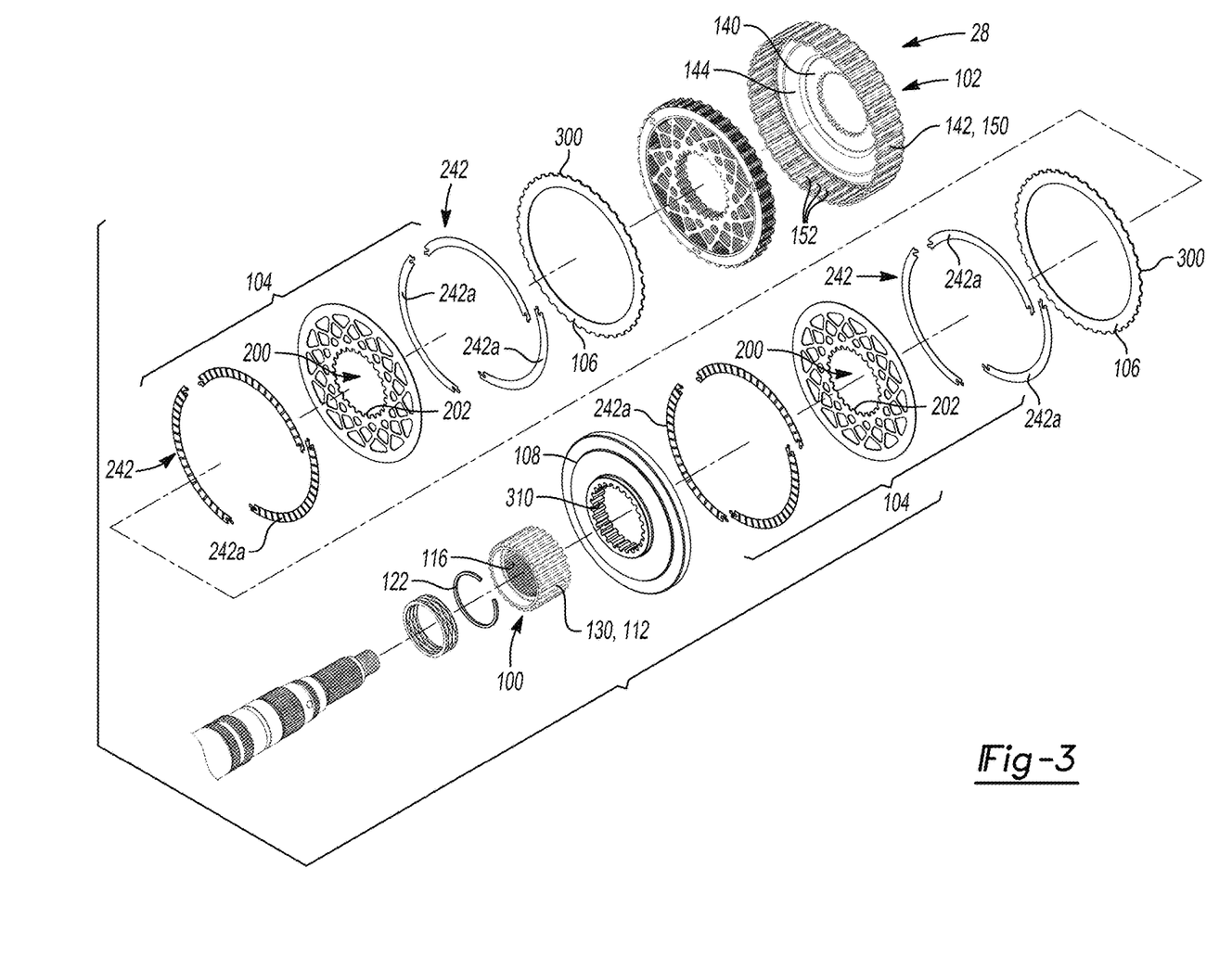
FIG. 3 is an exploded perspective view of the friction clutch.

With reference to FIGS. 2 and 3, the friction clutch 28 can include a clutch hub 100, a clutch housing 102, a plurality of first clutch plates 104, a plurality of second clutch plates 106 and a pressure plate 108. The clutch hub 100 can have a hub portion 110 and a first plate mount 112. The hub portion 110 can be non-rotatably coupled to the first output shaft 18 in any desired manner. In the example shown, the hub portion 110 defines a female splined aperture 116 that is received on a male splined segment 118 on the first output shaft 18. The clutch hub 100 can be received on the first output shaft 18 between a shoulder 120 on the drive element 22 and an external snap ring 122 that is received in a ring groove 124 formed in the first output shaft 18. The snap ring 122 can be employed to inhibit or limit movement of the clutch hub 100 along the first axis 40 in a direction away from the shoulder on the drive element 22. The first plate mount 112 can be fixedly coupled to (e.g., integrally and unitarily formed with) the hub portion 110. The first plate mount 112 can have a radially outer surface with a plurality of spline teeth 130 formed thereon. If desired, a plurality of clutch plate lubricant passages (not shown) can be formed radially through the clutch hub 100 so as to intersect the radially outer surface of the first plate mount 112.

The clutch housing 102 can be a drum-like structure having a radially-extending segment 140, a circumferentially-extending segment 142, and an intermediate segment 144. The radially-extending segment 140 has an annular shape and is oriented perpendicular to the first axis 40. The circumferentially-extending segment 142 is disposed about the first axis concentric with the clutch hub 100. The circumferentially-extending segment 142 defines a second plate mount 150 having a plurality of internal teeth 152 that are disposed on the radially inner surface of the circumferentially-extending segment 142. The intermediate segment 144 connects the radially-extending segment 140 to the circumferentially-extending segment 142. The clutch housing 102 having a first axial end 160, which is formed in part by an exterior surface of the radially-extending segment 140, and a second axial end 162 that is opposite the first axial end 160 and which is formed by an axial end of the circumferentially-extending segment 142 that is opposite the intermediate segment 144.

Figure 4:
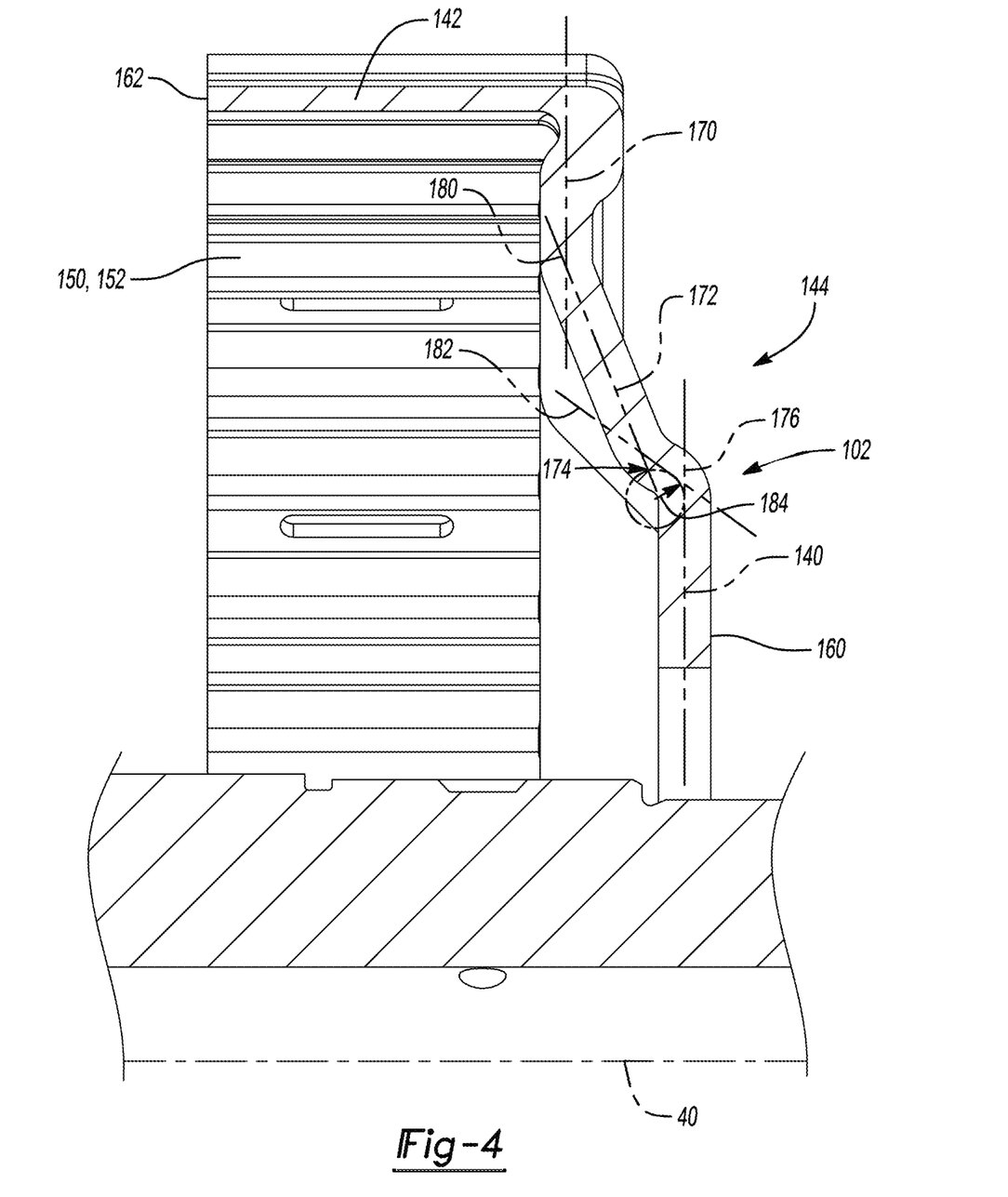
FIG. 4 is a longitudinal section view of a portion of a clutch housing of the friction clutch.

With reference to FIG. 4, the intermediate segment 144 can include a radially-extending portion 170, a first frusto-conical portion 172, a second frusto-conical portion 174, and a transition portion 176. The radially-extending portion 170 is concentric about, parallel to, and spaced axially apart from the radially-extending segment 140. The radially-extending segment 140 can be non-rotatably coupled to the drive element 22. In the example provided, internal teeth (not shown) are formed into the radially-extending segment 140 and is engaged to external teeth (not shown) that are formed on the drive element 22. The first frusto-conical portion 172 is coupled to a radially inner side of the radially-extending portion 170 and converges toward the first axis 40 with increasing distance along the first axis 40 from the radially-extending portion 170 in a direction toward the radially-extending segment 140. The first frusto-conical portion 172 has a (first) cone angle 180 with a first magnitude. The second frusto-conical portion 174 is coupled to a radially inner side of the first frusto-conical portion 172 and converges toward the first axis 40 with increasing distance along the first axis 40 from the first frusto-conical portion 172 in the direction toward the radially-extending segment 140. The second frusto-conical portion 174 has a (second) cone angle 182 with a second magnitude that is smaller than the first magnitude. The transition portion 176 connects a radially outer side of the radially-extending segment 140 to a radially inner side of the second frusto-conical portion 174. The transition portion 176 has a profile that is defined by a radius 184 that directly connects the radially outer side of the radially-extending segment 140 to the radially inner side of the second frusto-conical portion 174. The radius 184 is centered at a location that is disposed along the first axis 40 at a location that is between the first axial end 160 of the clutch housing 102 and the radially inner side of the first frusto-conical portion 172.

Returning to FIGS. 2 and 3, the first clutch plates 104 can be axially slidably but non-rotatably coupled to the first plate mount 112. In the example provided, the first clutch plates 104 conventionally have an aperture 200 that defines a plurality of spline teeth 202 and the first plate mount 112 is received into the aperture such that the spline teeth 130 of the first plate mount 112 meshingly engage the spline teeth of the first clutch plates 104.

Figure 5:
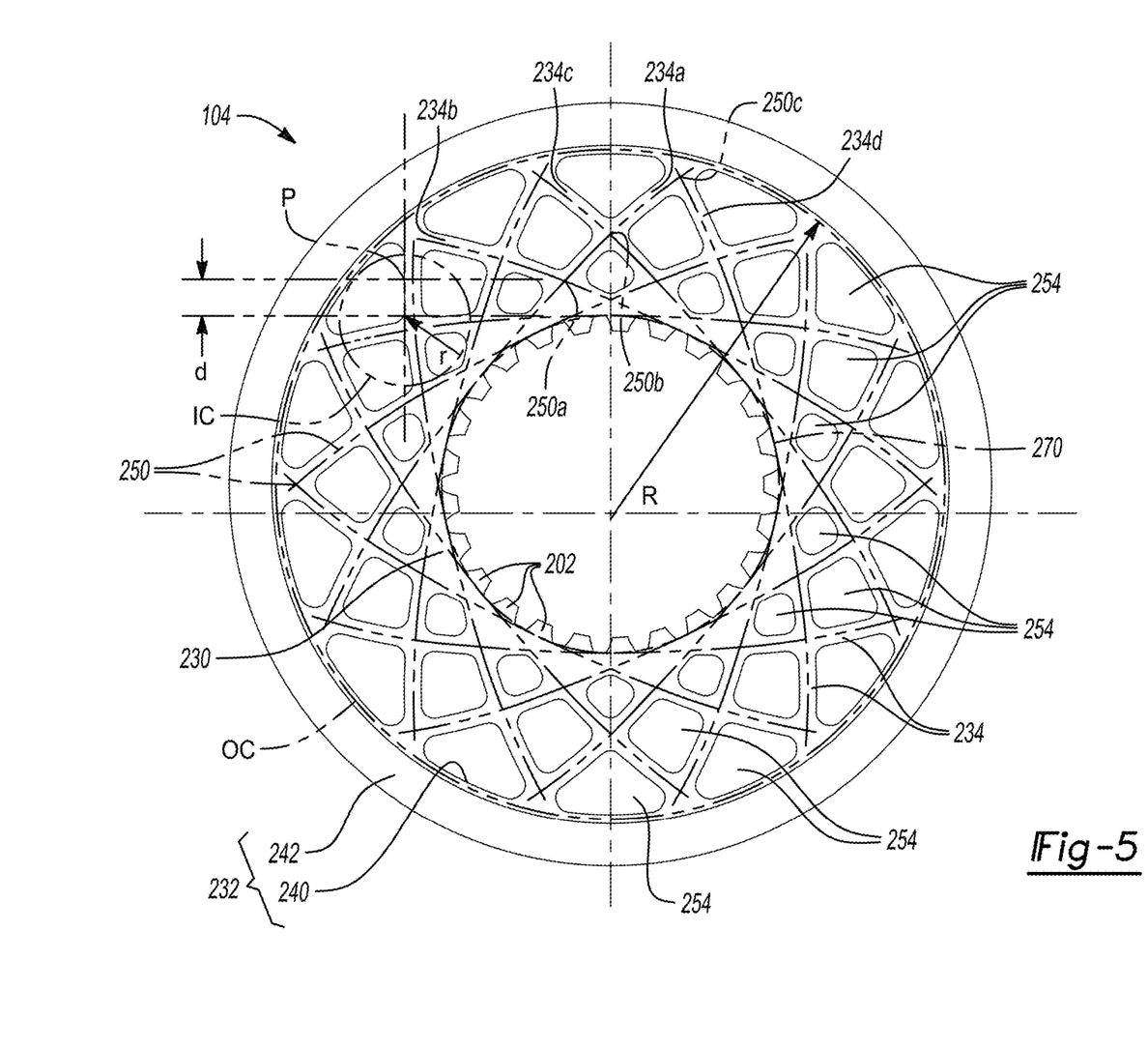
FIG. 5 is a front view of a first clutch plate of the friction clutch.

With reference to FIGS. 2, 3 and 5, each of the first clutch plates 104 has a hub member 230, a rim portion 232 and a plurality of rib members 234. The plurality of spline teeth 202 (i.e., female hub teeth) are formed on the hub member 230. The rim portion 232 is disposed concentrically about the hub member 230 and has a rim member 240 and a friction material 242 that is coupled to the rim member 240. In the example provided, the friction material 242 is formed in circumferentially-extending segments 242a (FIG. 3) that are assembled to one another to form a pair of annular structure that are fixedly coupled to the opposite axial surfaces of the rim member 240. It will be appreciated, however, that the friction material could be formed in fewer or more discrete components, that the discrete components may or may not abut one another in a circumferential direction, or that the friction material 242 could be formed as a single piece. Each of the rib members 234 extends radially between the hub member 230 and the rim member 240 to couple the hub member 230 and the rim member 240 to one another.

With specific reference to FIG. 5, each one of the rib members 234 is intersected by at least three of the other rib members 234 such that and each of the other three rib members 234 intersects the one of the rib members 234 at a distinct location 250 and the distinct locations 250 are spaced apart from one another along the one of the rib members 234 (e.g., rib member 234a is intersected by rib members 234b, 234c and 234d at locations 250a, 250b and 250c, respectively, that are distinct from one another and spaced apart from one another along the rib member 234a). The locations 250 where the rib members 234 intersect one another are disposed radially between the female hub teeth 202 and the rim member 240 to form a plurality of mass reduction apertures 254. A region of the first clutch plate 104 that is disposed radially between the hub member 230 and the rim member 240 has a first area (i.e., a total area), while the rib members 234 collectively have a second area, and the mass reduction apertures 254 collectively have a third area. A sum of the second and third areas is equal to the first area. The third area is greater than the second area.

FIGS. 6 through 9 depict alternative configuration of the first clutch plates 104. In some examples, the distinct locations 250 at which the rib members 234 intersect one another are all radially inward of the rim member 240.

Figure 7:
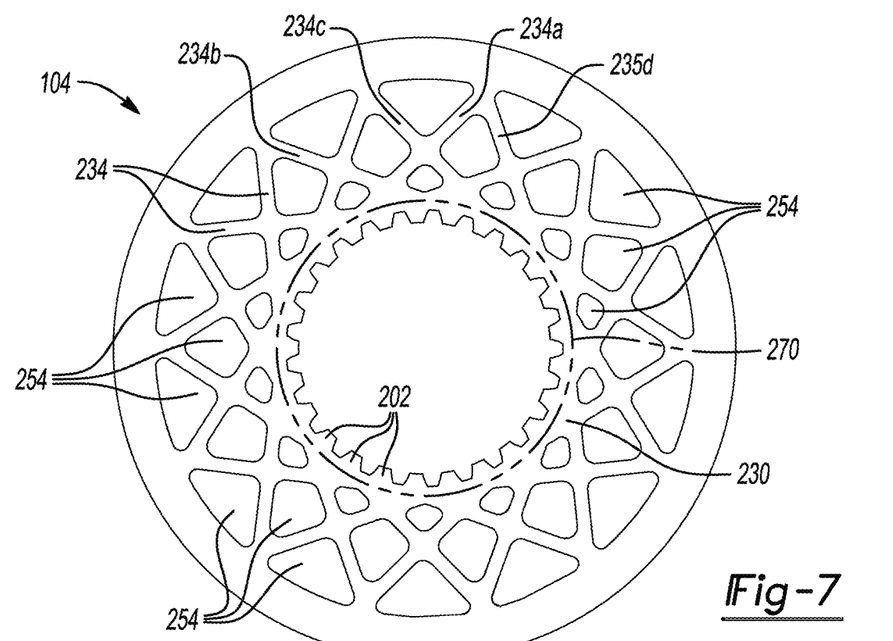
Figure 7A:
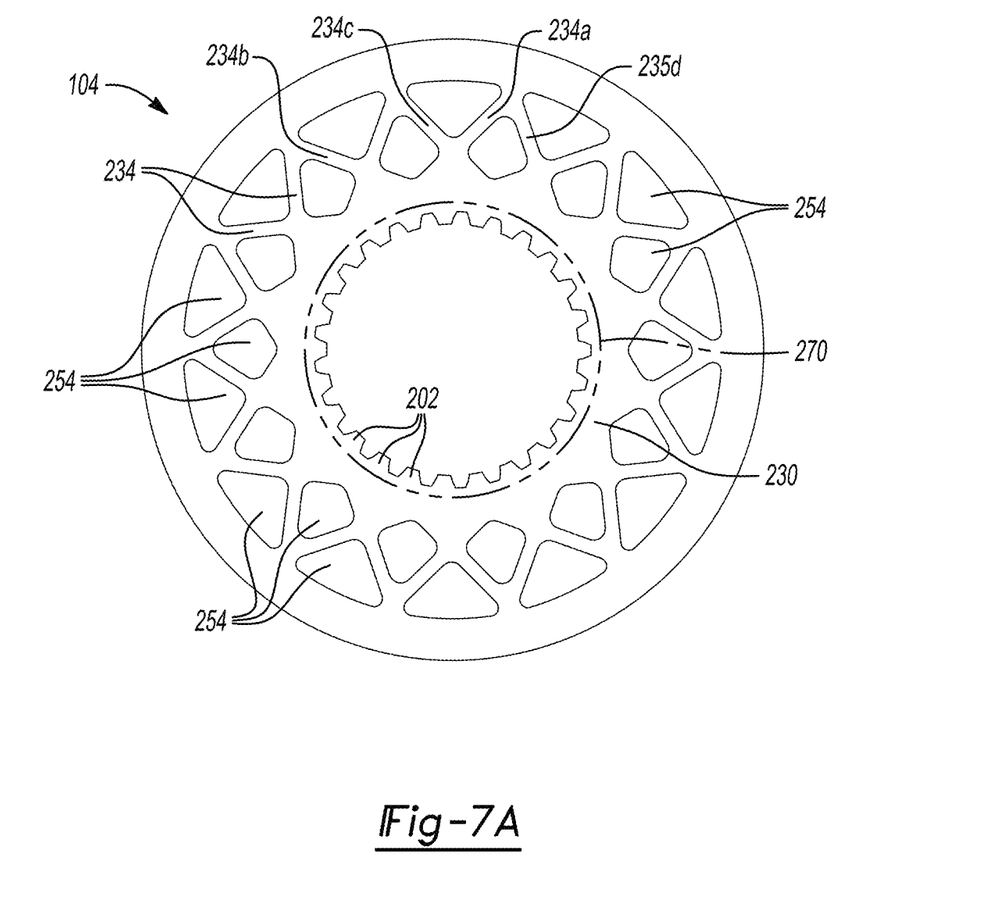

In some examples, each of the rib members 234 is tangent to a circle 270 (FIGS. 5 & 7) that is larger in diameter than the female hub teeth 202 and smaller in diameter than the hub member 230. Optionally, each of the rib members 234 can be formed as a straight (i.e., linear) segment as is specifically shown in FIG. 7. Optionally, as shown in FIG. 5, a pair of the rib members 234 can be formed along an arc that is tangent to the circle 270 such that the rib members 234 are joined to one another where they are tangent to the circle 270 and each extends outwardly therefrom toward the rim portion 232. If desired, one of the rib members 234 formed along the arc can have a first width, while the other one of the rib members 234 formed along the arc can have a second width that is smaller than the first width. Configuration in this manner provides the first clutch plate 104 with a torque capacity of a first magnitude in a first rotational direction, and a torque capacity of a second, smaller magnitude in a second rotational direction, which may be desirable, for example, in a situation where rotary power is transmitted through the first clutch plate 104 in a single rotational direction. In the configuration of FIGS. 5 and 7, the width of all of the rib members 234 is consistent so that the torque capacity of the first clutch plate 104 is the same in either rotational direction. The configuration of FIG. 7A is identical to that of FIG. 7 except that the innermost ring or circumferential row of the mass reduction apertures 254 shown in FIG. 7 are omitted in FIG. 7A to render the first clutch plate 104 somewhat more easy to manufacture. Nevertheless, each of the rib members 234 in the example of FIG. 7A intersects three other rib members 234. For example, rib member 234a intersects rib members 234b, 234c and 234d.

In some examples, such as the example of FIG. 5, the rib members 234 form a hypotrochoid that is disposed entirely between the female hub teeth 202 and the rim portion 232. The hypotrochoid can be formed by a point P attached to an inner circle IC that rolls around the inside of a larger, outer circle OC, wherein the inner circle IC has a radius r, wherein the point P that is attached to the inner circle IC is spaced by a distance d from a center of the inner circle IC, and wherein a ratio of the distance d divided by the radius r is greater than or equal to 0.4 and less than or equal to 0.8, preferably the ratio is greater than or equal to 0.5 and less than or equal to 0.7, and more preferably the ratio is equal to 0.6. Alternatively, the hypotrochoid is formed by a point P attached to an inner circle IC that rolls around the inside of a larger, outer circle OC, wherein the inner circle IC has a first radius r, wherein the outer circle OC has a second radius R, and wherein a ratio of the first radius r divided by the second radius R is greater than or equal to $1/4$ and is less than or equal to $1/2$, and preferably the ratio is equal to $5/14$.

Figure 6:
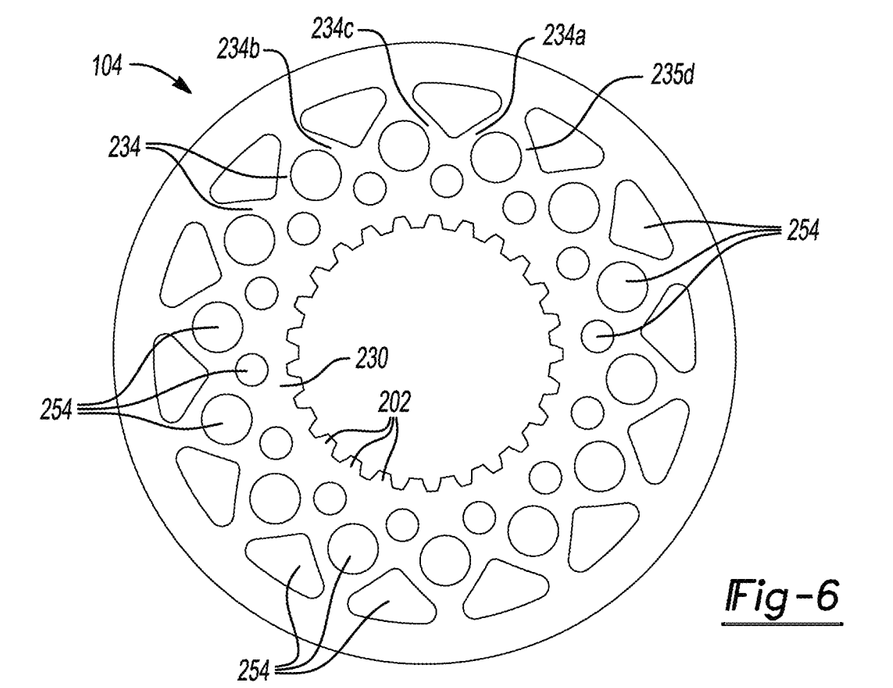
FIGS. 6 through 9 are front views of alternately configured first clutch plates.
Figure 8:
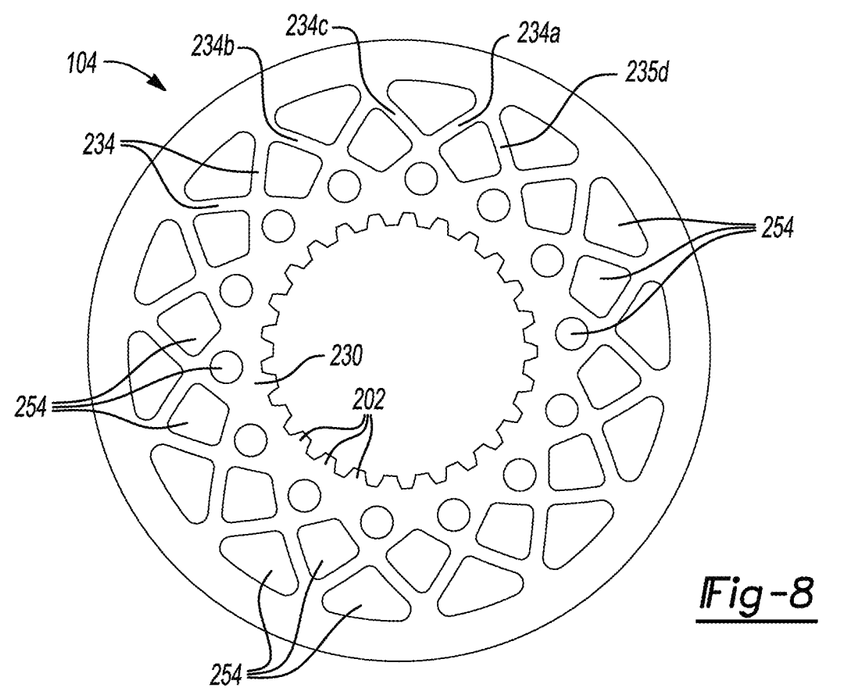
Figure 9:
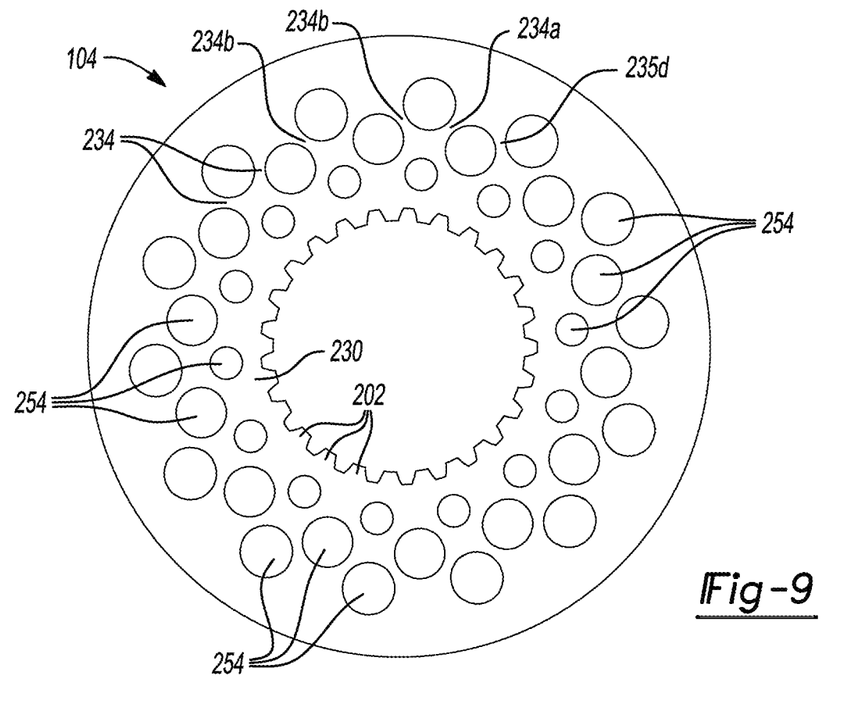

If desired, one or more sets of the mass reduction apertures 254 could be formed to a size and shape that are relatively easier or less expensive to form. For example, FIG. 6 depicts the two radially inner sets of mass reduction apertures 254 as being formed with a circular shape (i.e., a first set of mass reduction apertures 254 being formed as circular holes of a first diameter, and a second set of mass reduction apertures 254 disposed concentrically about the first set of mass reduction apertures 254 and being formed as circular holes of a second, larger diameter the centers of which are offset in a circumferential direction from the centers of the circular holes that form the first set of mass reduction apertures 254). FIG. 8 depicts an example in which only the radially inward most set of mass reduction apertures 254 are formed with a circular shape. FIG. 9 depicts all sets of mass reduction apertures 254 as being formed with a circular shape.

Returning to FIGS. 2 and 3, the second clutch plates 106 can be interleaved with the first clutch plates 104 and can be axially slidably but non-rotatably coupled to the second plate mount 150. In the example provided, the second clutch plates 106 conventionally have an annular body with an outer diametrical surface that defines a plurality of external spline teeth 300 and the second clutch plates 106 are received into the second plate mount 150 such that the external spline teeth 300 of the second clutch plates 106 meshingly engage the internal teeth 152 of the second plate mount 150.

The first and second clutch plates 104 and 106 can collectively form a clutch pack and the pressure plate 108 can be disposed on a side of the clutch pack that is opposite the radially-extending segment 140 of the clutch housing 102. The pressure plate 108 can be axially slidably but non-rotatably coupled to the first plate mount 112. For example, the pressure plate 108 can have an aperture that defines a plurality of internal spline teeth 310 and which receives the first plate mount 112 such that the spline teeth 130 of the first plate mount 112 meshingly engage the internal spline teeth 310 of the pressure plate 108.

With reference to FIGS. 1 and 2, the clutch actuator 30 can be any type of actuator that develop and exert force onto the friction clutch 28 to frictionally engage the first and second clutch plates 104 and 106 to one permit the transmission of rotary power between the clutch hub 100 and the clutch housing 102. In the example provided, the clutch actuator 30 is a conventional ball-ramp actuator of the type that is well known in the art and as such, a detailed discussion of the construction and operation of the ball-ramp actuator need not be provided herein. Briefly, a rotational drag can be applied to the ball-ramp actuator to cause a first ball-ramp ring to thrust away from a second ball-ramp ring and apply a compressive force to the pressure plate 108, which engages the first and second clutch plates 104 and 106 to one another to cause rotary power to be transmitted from the first output shaft 18, through the friction clutch 28 and to the drive element 22.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A friction clutch comprising:
a clutch plate having a hub member, a rim portion and a plurality of rib members, the hub member having a plurality of female hub teeth, the rim portion being disposed concentrically about the hub member and having a rim member and a friction material that is coupled to the rim member, each of the rib members extending radially between the hub member and the rim member to couple the hub member and the rim member to one another, each one of the rib members being intersected by at least three of the other rib members such that and each of the other three rib members intersects the one of the rib members at a distinct location and the distinct locations are spaced apart from one another along the one of the rib members.

2. The friction clutch of claim 1, wherein the rib members form a hypotrochoid that is disposed entirely between the female hub teeth and the rim portion.

3. The friction clutch of claim 2, wherein the hypotrochoid is formed by a point attached to an inner circle that rolls around the inside of a larger, outer circle, wherein the inner circle has a radius (r), wherein the point that is attached to the inner circle is spaced by a distance (d) from a center of the inner circle, and wherein a ratio of the distance (d) divided by the radius (r) is greater than or equal to 0.4 and less than or equal to 0.8.

4. The friction clutch of claim 3, wherein the ratio is greater than or equal to 0.5 and less than or equal to 0.7.

5. The friction clutch of claim 4, wherein the ratio is equal to 0.6.

6. The friction clutch of claim 2, wherein the hypotrochoid is formed by a point attached to an inner circle that rolls around the inside of a larger, outer circle, wherein the inner circle has a first radius (r), wherein the outer circle has a second radius (R), and wherein a ratio of the first radius (r) divided by the second radius (R) is greater than or equal to ¼ and is less than or equal to ½.

7. The friction clutch of claim 6, wherein the ratio is equal to 5/14.

8. The friction clutch of claim 1, wherein each of the rib members is tangent to a circle that is larger in diameter than the female hub teeth and smaller in diameter than the hub member.

9. The friction clutch of claim 8, wherein each of the rib members is a straight segment.

10. The friction clutch of claim 8, wherein a pair of rib members are formed along an arc that is tangent to the circle.

11. The friction clutch of claim 1, wherein the clutch plate is configured to carry a higher torsional load in one rotational direction than the other rotational direction.

12. The friction clutch of claim 11, wherein each of the rib members has an arcuate shape.

13. A friction clutch comprising:
a clutch plate having a hub member, a rim portion and a plurality of rib members, the hub member having a plurality of female hub teeth, the rim portion being disposed concentrically about the hub member and having a rim member and a friction material that is coupled to the rim member, each of the rib members extending radially between the hub member and the rim member to couple the hub member and the rim member to one another, wherein the rib members intersect one another between the female hub teeth and the rim member to form a plurality of mass reduction apertures, wherein a region of the clutch plate that is disposed radially between the hub member and the rim member has a first area, wherein the rib members collectively have a second area, wherein the mass reduction apertures collectively have a third area, wherein a sum of the second and third areas is equal to the first area, and wherein the third area is greater than the second area.

14. The friction clutch of claim 13, wherein each of the rib members is tangent to a circle that is larger in diameter than the female hub teeth and smaller in diameter than the hub member.

15. The friction clutch of claim 14, wherein each of the rib members is a straight segment.

16. The friction clutch of claim 14, wherein a pair of rib members are formed along an arc that is tangent to the circle.

17. The friction clutch of claim 13, wherein the clutch plate is configured to carry a higher torsional load in one rotational direction than the other rotational direction.

18. The friction clutch of claim 17, wherein each of the rib members has an arcuate shape.

19. The friction clutch of claim 13, wherein the rib members form a hypotrochoid that is disposed entirely between the female hub teeth and the rim portion.

20. A friction clutch comprising:
a hub that is rotatable about a rotary axis;
a clutch housing having a radially-extending segment, a circumferentially-extending segment, and an intermediate segment, the radially-extending segment having an annular shape and being oriented perpendicular to the rotary axis, the circumferentially-extending segment being disposed about the rotary axis concentric with the hub, the circumferentially-extending segment defining a plurality of internal teeth, the intermediate segment connecting the radially-extending segment to the circumferentially-extending segment, the clutch housing having a first axial end, which is formed in part by an exterior surface of the radially-extending wall, and a second axial end that is opposite the first axial end and which is formed by the circumferentially-extending segment; and
a clutch pack received in the clutch housing, the clutch pack having a plurality of first clutch plates, which are axially-slidably but non-rotatably coupled to the hub, and a plurality of second clutch plates that are interleaved with the first clutch plates, the second clutch plates having a plurality of external teeth that are engaged to the internal teeth on the circumferentially-extending segment to thereby axially-slidably but non-rotatably couple the second clutch plates to the clutch housing;
wherein the intermediate segment includes a radially-extending portion, a first frusto-conical portion, a second frusto-conical portion, and a transition portion, the radially-extending portion being concentric about, parallel to, and spaced axially apart from the radially-extending wall, the first frusto-conical portion being coupled to a radially inner side of the radially-extending portion and converging toward the rotary axis with increasing distance along the rotary axis from the radially-extending portion, the first frusto-conical portion having a cone angle with a first magnitude, the second frusto-conical portion being coupled to a radially inner side of the first frusto-conical portion and converging toward the rotary axis with increasing distance along the rotary axis from the first frusto-conical portion, the second frusto-conical portion having a cone angle with a second magnitude that is smaller than the first magnitude, the transition portion connecting a radially outer side of the radially-extending segment to a radially inner side of the second frusto-conical portion, the transition portion having a profile that is defined by a radius that directly connects the radially outer side of the radially-extending segment to the radially inner side of the second frusto-conical portion, the radius being centered at a location that is disposed between the first axial end of the clutch housing and the radially inner side of the first frusto-conical portion.

* * * * *